United States Patent
Huang et al.

(10) Patent No.: US 7,108,757 B2
(45) Date of Patent: Sep. 19, 2006

(54) HYDROGEN STORAGE ALLOYS PROVIDING FOR THE REVERSIBLE STORAGE OF HYDROGEN AT LOW TEMPERATURES

(75) Inventors: Baoquan Huang, Troy, MI (US); Stanford R. Ovshinsky, Bloomfield Hills, MI (US)

(73) Assignee: Ovonic Hydrogen Systems LLC, Rochester Hills, MI (US)

( * ) Notice: Subject to any disclaimer, the term of this patent is extended or adjusted under 35 U.S.C. 154(b) by 395 days.

(21) Appl. No.: 10/637,100

(22) Filed: Aug. 8, 2003

(65) Prior Publication Data

US 2005/0067060 A1 Mar. 31, 2005

(51) Int. Cl.
- C22C 14/00 (2006.01)
- C22C 27/02 (2006.01)
- C22C 27/06 (2006.01)
- H01M 4/58 (2006.01)

(52) U.S. Cl. ............ 148/421; 148/422; 148/423; 420/417; 420/421; 420/424; 420/428; 420/900; 429/218.2; 429/231.5

(58) Field of Classification Search .......... None
See application file for complete search history.

(56) References Cited

U.S. PATENT DOCUMENTS

| | | | | |
|---|---|---|---|---|
| 4,160,014 A | * | 7/1979 | Gamo et al. | 423/644 |
| 4,551,400 A | * | 11/1985 | Sapru et al. | 429/94 |
| 4,728,586 A | * | 3/1988 | Venkatesan et al. | 429/94 |
| 4,849,205 A | * | 7/1989 | Hong | 423/644 |
| 5,238,756 A | * | 8/1993 | Fetcenko et al. | 429/59 |
| 5,541,017 A | * | 7/1996 | Hong et al. | 429/59 |
| 5,968,291 A | * | 10/1999 | Iba et al. | 148/421 |
| 6,153,032 A | * | 11/2000 | Iba et al. | 148/669 |
| 6,616,891 B1 | * | 9/2003 | Sapru et al. | 420/421 |
| 6,835,490 B1 | * | 12/2004 | Okada et al. | 429/59 |
| 2002/0179196 A1 | * | 12/2002 | Okada et al. | 148/421 |
| 2002/0189723 A1 | * | 12/2002 | Okada et al. | 148/538 |
| 2004/0011444 A1 | * | 1/2004 | Okada et al. | 148/712 |
| 2005/0079090 A1 | * | 4/2005 | Okada et al. | 420/428 |

FOREIGN PATENT DOCUMENTS

| | | | |
|---|---|---|---|
| JP | 04-337045 | * | 11/1992 |
| JP | 58-217654 | * | 12/1993 |
| JP | 7-252560 | * | 10/1995 |
| JP | 8-302442 | * | 11/1996 |
| JP | 11-106859 | | 4/1999 |
| WO | 4-74845 | * | 3/1992 |
| WO | WO00/58529 | * | 10/2000 |

OTHER PUBLICATIONS

The American Heritage Dictionary of the English Language, 1976, p. 14.*

* cited by examiner

*Primary Examiner*—John Sheehan
(74) *Attorney, Agent, or Firm*—David W. Schumaker; Marvin S. Siskind

(57) ABSTRACT

A reversible hydrogen storage alloy capable of storing large amounts of hydrogen and delivering reversibly large amounts of hydrogen at temperatures ranging from 0° C. up to 40° C. The hydrogen storage alloy is generally composed of titanium, vanadium, and chromium. The alloy may further include manganese. Modifier elements such as zirconium, iron, nickel, molybdenum, ruthenium, and/or cobalt, and scavenger elements such as misch metal, calcium, and/or magnesium may be included in the alloy to improve performance.

16 Claims, 11 Drawing Sheets

HYDROGEN STORAGE ALLOYS PROVIDING FOR THE REVERSIBLE STORAGE OF HYDROGEN AT LOW TEMPERATURES

FIELD OF THE INVENTION

The present invention relates to hydrogen storage alloys utilized for the reversible storage of hydrogen. More particularly, the present invention relates to hydrogen storage alloys capable of reversibly storing large amounts of hydrogen at temperatures of 40° C. or less.

BACKGROUND

Hydrogen storage is a technology critical to a wide variety of applications, some of the most prevalent being fuel cells, portable power generation, and hydrogen combustion engines. Such applications would benefit substantially from hydrogen storage alloys capable of absorbing and desorbing higher amounts of hydrogen as compared to present day commercially available hydrogen storage alloys. Hydrogen storage alloys having the hydrogen absorption and desorption characteristics of the present invention will benefit such applications by providing longer operating life and/or range on a single charge for hydrogen power generators, fuel cells, and hydrogen internal combustion engines.

In the past, considerable attention has been given to the use of hydrogen as a fuel or fuel supplement. While the world's oil reserves are being rapidly depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential as a fuel, a major drawback in its utilization, especially in mobile uses such as the powering of vehicles, has been the lack of acceptable lightweight hydrogen storage medium. Conventionally, hydrogen has been stored in a pressure-resistant vessel under a high pressure or stored as a cryogenic liquid, being cooled to an extremely low temperature. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas would weigh about thirty times the weight of a container of gasoline. Additionally, transfer of a large sized vessel is very difficult. Furthermore, storage as a liquid presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen.

Certain metals and alloys allow for the reversible storage of hydrogen. In this regard, they have been considered as a possible form of hydrogen-storage, due to their large hydrogen-storage capacity. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase storage of hydrogen in a metal or alloy system works by absorbing hydrogen through the formation of a metal hydride under a specific temperature/pressure or electrochemical conditions, and releasing hydrogen by changing these conditions. Metal hydride systems have the advantage of high-density hydrogen-storage for long periods of time, since they are formed by the insertion of hydrogen atoms into the crystal lattice of a metal. A desirable hydrogen storage material must have a high storage capacity relative to the weight of the material, a suitable desorption temperature/pressure, good kinetics, good reversibility, resistance to poisoning by contaminants including those present in the hydrogen gas, and be of a relatively low cost. If the material fails to possess any one of these characteristics it will not be acceptable for wide scale commercial utilization.

The hydrogen storage capacity per unit weight of material is an important consideration in many applications, particularly where the hydride does not remain stationary. A low hydrogen storage capacity relative to the weight of the material reduces the mileage and hence the range of a hydrogen fueled vehicle making the use of such materials. A low desorption temperature is desirable to reduce the amount of energy required to release the hydrogen. Furthermore, a relatively low desorption temperature to release the stored hydrogen is necessary for efficient utilization of the available exhaust heat from vehicles, machinery, fuel cells, or other similar equipment.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

Hydrogen storage materials include a variety of metallic materials such as Mg, Mg—Ni, Mg—Cu, Ti—Fe, Ti—Mn, Ti—Ni, Mm—Ni and Mm—Co alloy systems (wherein, Mm is Misch metal, which is a rare-earth metal or combination/alloy of rare-earth metals). However, basic hydrogen storage metals or alloys do not have all of the properties required for a storage medium with widespread commercial utilization.

Of these materials, the Mg alloy systems can store relatively large amounts of hydrogen per unit weight of the storage material. However, heat is needed to release the hydrogen stored in the alloy, because of its low hydrogen dissociation equilibrium pressure at room temperature.

The use of rare-earth (Misch metal) alloys have several drawbacks. Although they can be formulated to absorb and release hydrogen at room temperature, based on the fact that they have a hydrogen dissociation equilibrium pressure on the order of several atmospheres at room temperature, their hydrogen-storage capacity per unit weight is lower than desirable.

Transition metal alloy systems, like the Ti—Fe alloy system, have the advantage that they can be formulated with a hydrogen dissociation equilibrium pressure of several atmospheres at room temperature. However, these alloys typically require a high temperature of about 350° C. and a high pressure of over 30 atmospheres for initial hydrogenation, while providing only relatively low hydrogen absorption/desorption rates. Also, these alloy systems exhibit a hysteresis problem which hinders the complete release of hydrogen stored therein.

Under the circumstances, a variety of approaches have been made to solve the problems of the prior art and to develop an improved material which has a high hydrogen-storage efficiency, a proper hydrogen dissociation equilibrium pressure and a high absorption/desorption rate.

SUMMARY OF THE INVENTION

The hydrogen storage alloys of the present invention are capable of storing large amounts of hydrogen and delivering reversibly large amounts of hydrogen at temperatures ranging from 0° C. up to 40° C. These hydrogen storage alloys allow fuel cells and other hydrogen applications to continue operating for longer periods of time without the need for recharging as compared to the present day hydrogen storage alloys. Furthermore, the hydrogen storage alloys of the present invention are able to desorb a substantial amount of hydrogen without the need for extremely high temperatures.

The hydrogen storage alloys of the present invention are capable of storing about 4 wt. % hydrogen and delivering reversibly up to 2.8 wt. % hydrogen at temperatures ranging from 0° C. up to 40° C. In accordance with the present invention, there is disclosed herein a hydrogen storage alloy having a single phase body centered cubic crystal structure. The hydrogen storage alloy comprises 10 to 40 atomic percent titanium, 0.5 to 80 atomic percent vanadium, 10 to 60 atomic percent chromium, and 0.0 to 15 atomic percent manganese wherein the hydrogen storage alloy, at temperatures of 40° C. or less, is adapted to reversibly store at least 1.75 weight percent hydrogen and desorb at least 60% of the hydrogen stored at the maximum hydrogen storage capacity of the hydrogen storage alloy. Preferably, the hydrogen storage alloy is adapted to reversibly store at least 2.0 weight percent hydrogen at temperatures of 40° C. or less. Most preferably, the hydrogen storage alloy is adapted to reversibly store at least 2.3 weight percent hydrogen at temperatures of 40° C. or less. Preferably, the hydrogen storage alloy is adapted to desorb at least 65% of the hydrogen stored at the maximum hydrogen storage capacity at temperatures of 40° C. or less. Most preferably, the hydrogen storage alloy is adapted to desorb at least 70% of the hydrogen stored at the maximum hydrogen storage capacity at temperatures of 40° C. or less.

The hydrogen storage alloy may further comprise one or more modifier elements such as cobalt, iron, nickel, copper, ruthenium, rhenium, rhodium, copper, palladium, osmium, molybdenum, niobium, tungsten, platinum, iridium, silver, or combinations thereof. The hydrogen storage alloy may also comprise one or more scavenger elements adapted to scavenge oxygen, nitrogen, and carbon from the alloy. The scavenging elements may be selected from misch metal/rare earth elements, magnesium, calcium, or combinations thereof.

DETAILED DESCRIPTION OF PREFERRED EMBODIMENTS OF THE INVENTION

In accordance with the present invention, there is disclosed herein a hydrogen storage alloys capable of storing up to 4 wt. % hydrogen and delivering reversibly at least 1.75 weight % hydrogen at temperatures ranging from 0° C. to 40° C. The hydrogen storage alloys in accordance with the present invention generally have a body centered cubic structure with one or more phases. The hydrogen storage alloy may be generally include titanium, vanadium, and chromium. Titanium is preferably present in the amount of 10 to 40 atomic percent, most preferably in the range of 20 to 30 atomic percent. Vanadium is preferably present in the amount of 1.0 to 80 atomic percent. Chromium is preferably present in the amount of 15 to 60 atomic percent, most preferably within the range of 25 to 40 atomic percent. The hydrogen storage alloy may additionally include manganese in the amount of greater than 0 to 10 atomic percent.

The hydrogen storage alloy of the present invention may also include one or more modifier elements selected from zirconium, iron, nickel, molybdenum, cobalt, niobium, palladium, ruthenium, and boron. Such elements may be included alone or in combination in the hydrogen storage alloy in the range of greater than 0 to 12 atomic percent.

Figure 1:
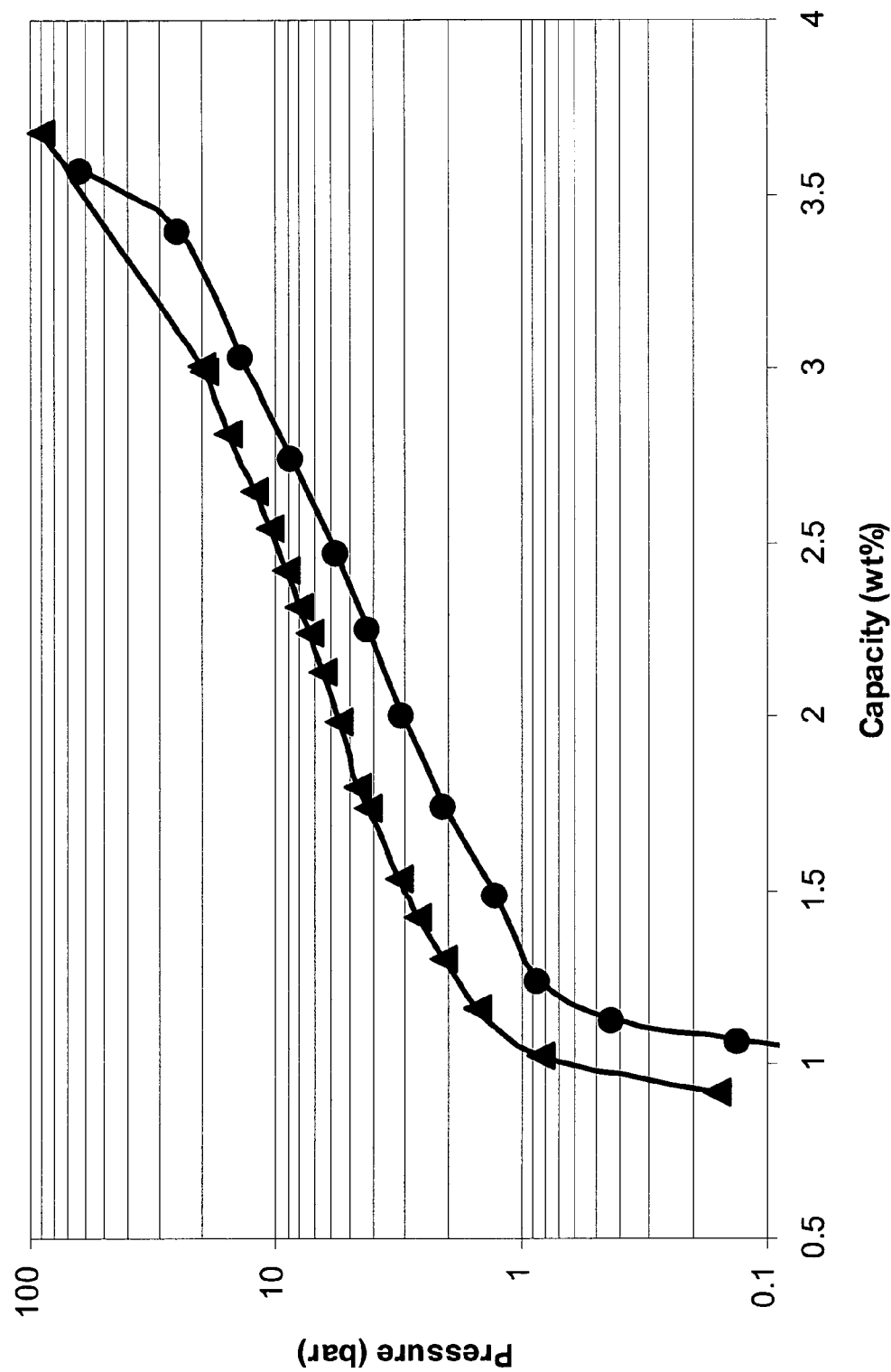
FIG. 1, is a PCT diagram showing the desorption and absorption of the OV569 alloy in accordance with the present invention.
Figure 2:
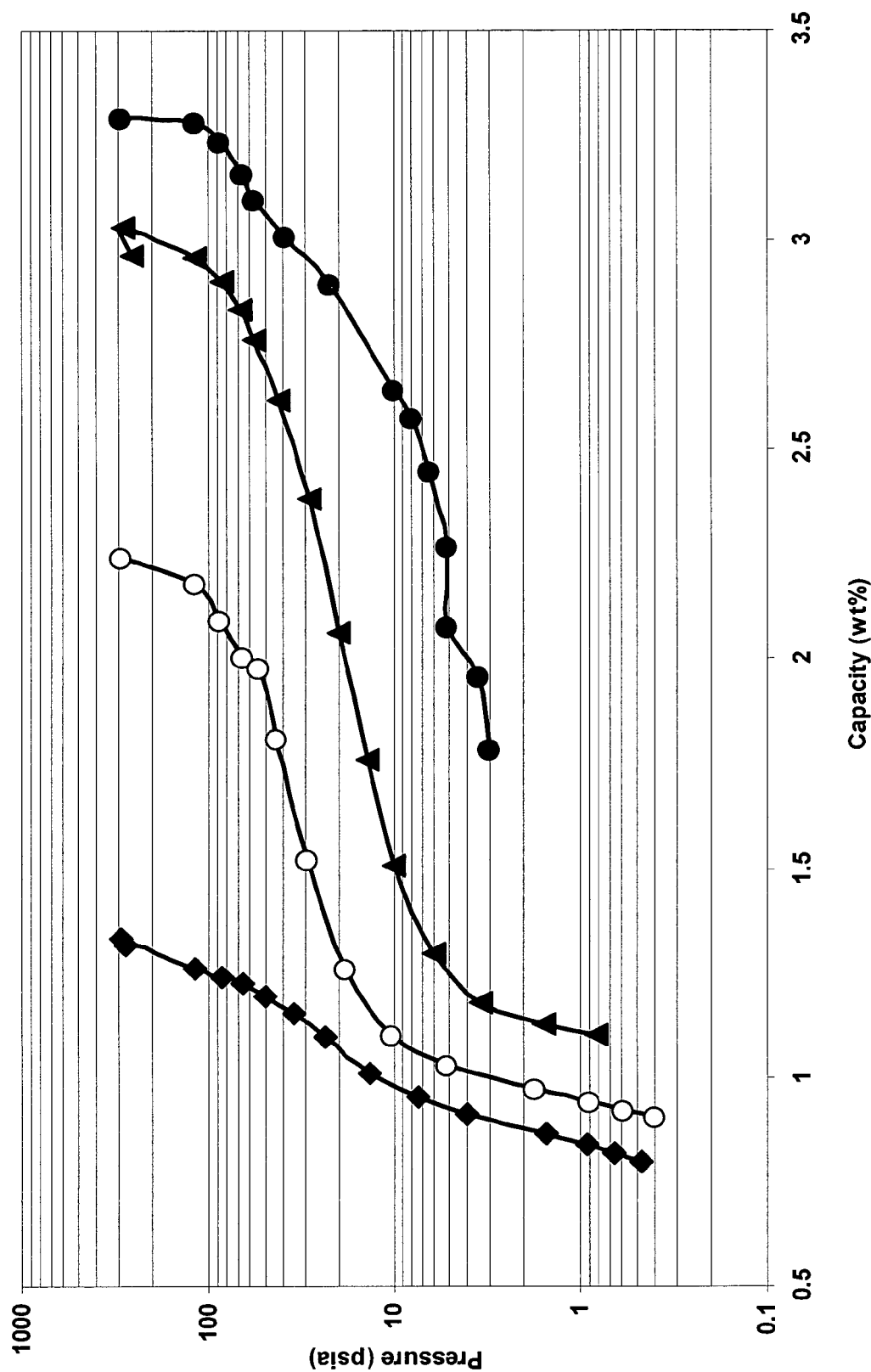
FIG. 2, is a PCT diagram showing the desorption at different temperatures of the OV565 alloy in accordance with the present invention.
Figure 3:
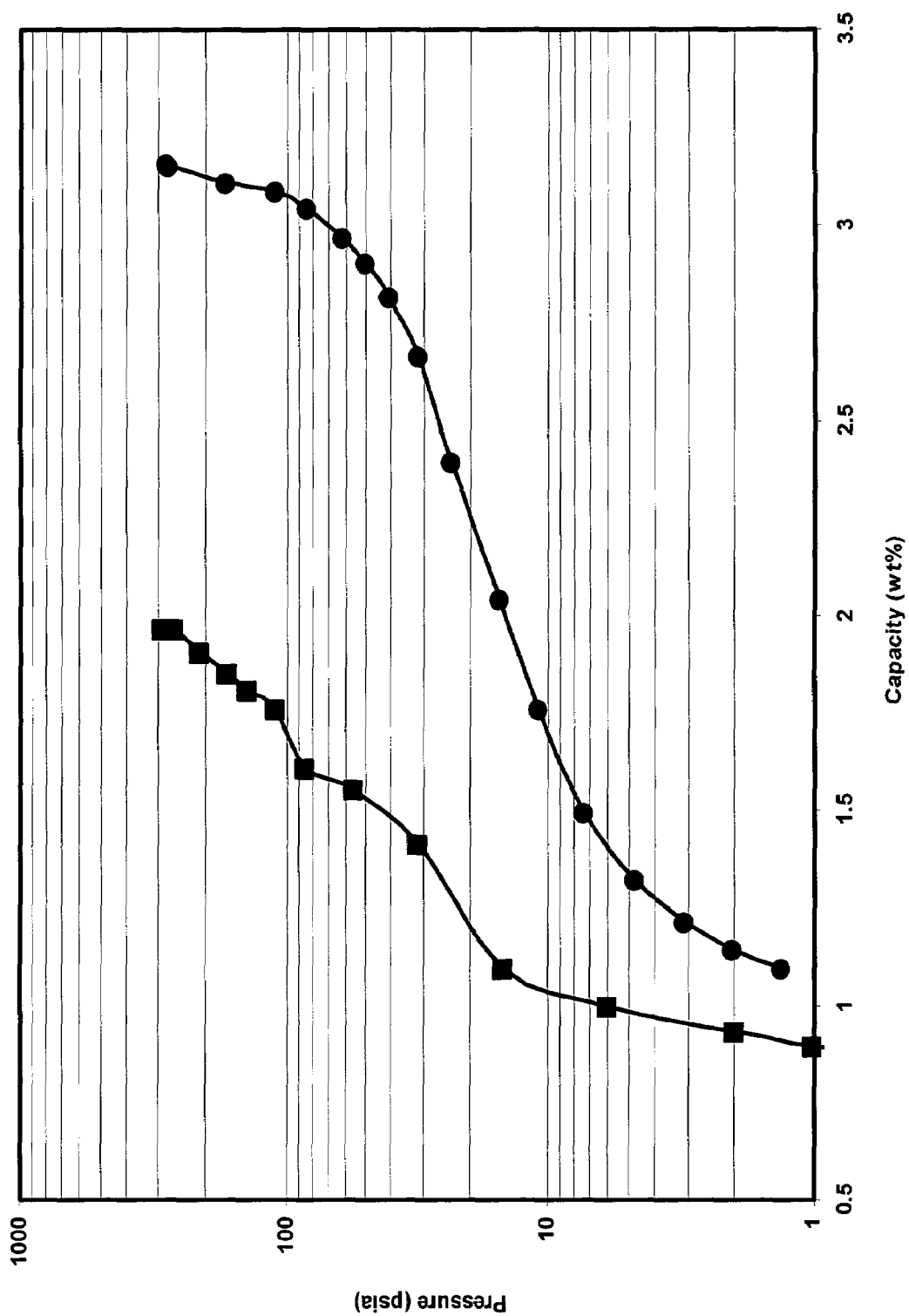
FIG. 3, is a PCT diagram showing the effect of molybdenum on the desorption of hydrogen in alloys in accordance with the present invention.

One type of alloys in accordance with the present invention are low vanadium content body centered cubic hydrogen storage alloys. Such alloys are shown with respective absorption and desorption capacities below in Table 1. Shown in FIG. 1, is a PCT diagram demonstrating the absorption at 0° C. (▲) and desorption at 30° C. (●) for the $Ti_{37}V_5Cr_{50}Mo_8$ alloy in accordance with the present invention. Shown in FIG. 2, is a PCT diagram demonstrating the desorption at 0° C. (●), 30° C. (▲), 45° C. (○), and 60° C. (♦) for the $Ti_{35}V_{10}Cr_{50}Mo_5$ alloy in accordance with the present invention. These alloys exhibit excellent reversibility and desorption characteristics at temperatures of 40° C. or less. Generally speaking, body centered cubic phases exist where the average number of outer electrons is less that 5.4. Although not desiring to be bound by theory, in order to meet the low outer electron requirements in these hydrogen storage alloys, the concentration of titanium in low vanadium content alloys should be significantly higher than the concentration of titanium in similar alloys having $AB_2$-type Laves phases. High titanium content can result in hydrogen storage alloys having high thermal stability, thereby restricting high titanium content alloys to hydrogen storage applications requiring a high amount of heat for hydrogen desorption. The electronegativity of molybdenum is higher than that of chromium. By partially replacing some of the chromium within the alloy with molybdenum, the thermal stability of the alloy may be reduced. Moreover, elements like molybdenum can act to stabilize the body centered cubic structure of the alloy because the atomic radius of molybdenum (1.39 Å) is much closer to titanium (1.45 Å) than chromium (1.30 Å). The inclusion of molybdenum into low vanadium content body centered cubic phase hydrogen storage alloys results in a greater hydrogen absorption capacity along with higher reversibility. Shown in FIG. 3, is a PCT diagram demonstrating the effect of molybdenum on the desorption of hydrogen. Specifically shown is the $Ti_{35}V_{10}Cr_{50}Mo_5$ alloy in accordance with the present invention (●) and a hydrogen storage alloy having the formula $Ti_{35}V_{10}Cr_{55}$ (■).

Figure 5:
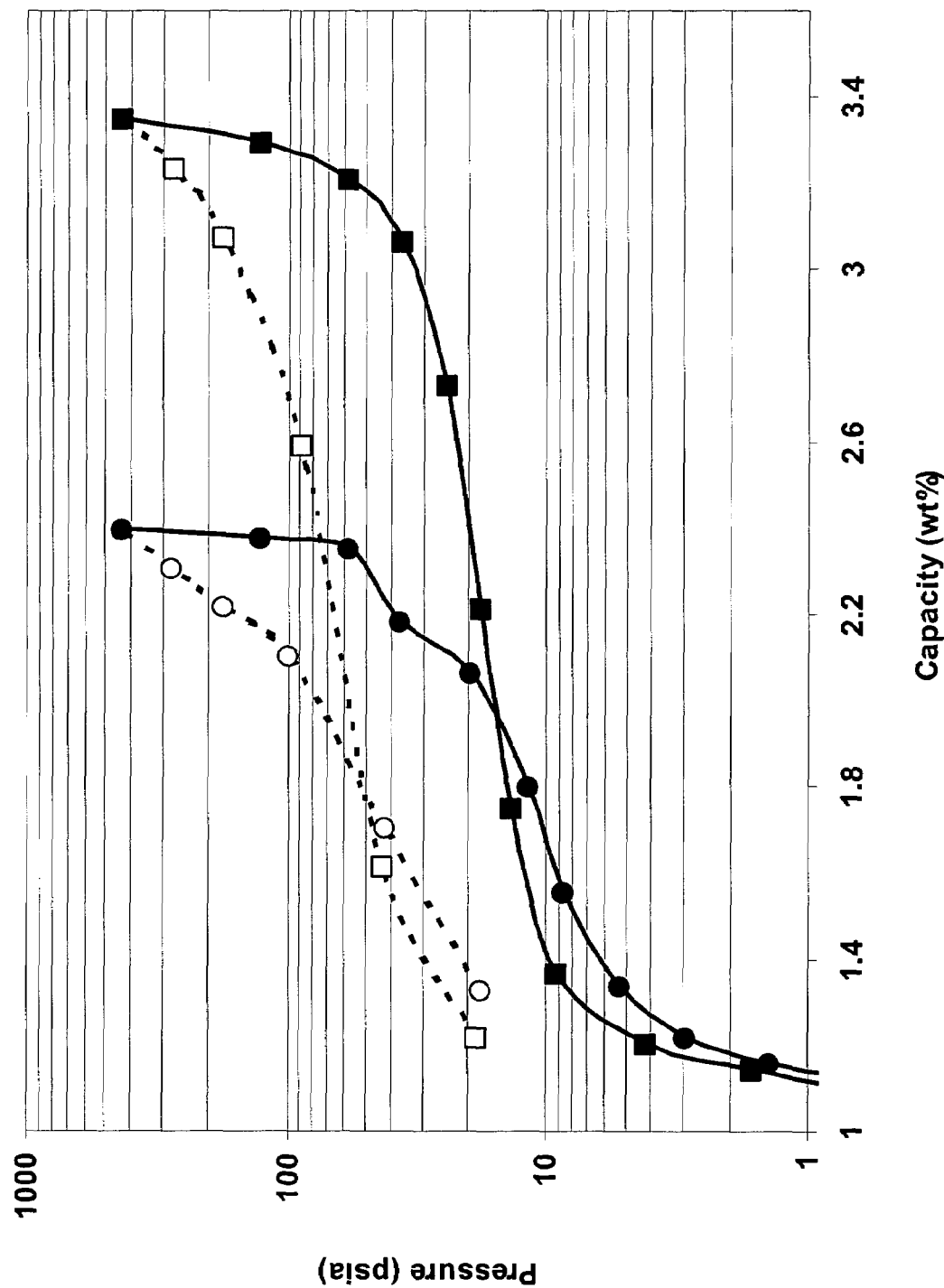
FIG. 5, is a PCT diagram showing the effect of manganese on the absorption and desorption of hydrogen in alloys in accordance with the present invention.

Another type of hydrogen storage alloys in accordance with the present invention are high vanadium content body centered cubic hydrogen storage alloys. Such alloys are shown with respective absorption and desorption capacities in Table 3. In these alloys, vanadium is a primary element (solvent) into which a small amount of other transition elements (solute) are dissolved thereby forming solid solution. Titanium and chromium are able to be dissolved into the vanadium basic structure and the titanium/chromium ratio can be varied to control PCT properties of the alloy. Small additions of manganese have shown improvement in the hydrogen storage properties of the hydrogen storage alloy, especially in activation of the alloy. Shown in FIG. 5, is a PCT diagram demonstrating the effect of manganese on the absorption and desorption of hydrogen in alloys in accordance with the present invention. Specifically shown is the $Ti_{20}V_{50}Cr_{25}Mn_5$ alloy (■) and the $Ti_{20}V_{50}Cr_{20}Mn_{10}$ alloy (●).

TABLE 1

| Composition | (H wt %)$_{max}$ | (H wt %)$_{rev}$ | P$_{abs}$ (atm) | T$_{abs}$ (° C.) | P$_{des}$ (atm) | T$_{des}$ (° C.) |
|---|---|---|---|---|---|---|
| Ti35V20Cr45 | 3.20 | 2.00 | 20 | 40 | 0.1 | 60 |
| Ti35V15Cr45Mo5 | 3.05 | 1.85 | 20 | 40 | 0.1 | 40 |
| Ti35V10Cr50Mo5 | 3.29 | 2.40 | 20 | 0 | 0.1 | 60 |
| Ti37V5Cr50Mo8 | 3.60 | 2.60 | 100 | 0 | 0.1 | 30 |
| Ti37V5Cr53Mo5 | 3.20 | 2.00 | 20 | 0 | 0.1 | 0 |
| Ti37V5Cr48Mo10 | 3.20 | 2.10 | 20 | 0 | 0.1 | 0 |
| Ti38V4Cr48Mo10 | 3.10 | 1.90 | 20 | 40 | 0.1 | 40 |
| Ti38V4Cr48Mo10 | 3.20 | 2.00 | 20 | 0 | 0.1 | 0 |
| Ti38V3Cr48Mo11 | 3.20 | 2.00 | 20 | 30 | 0.1 | 30 |
| Ti38V3Cr48Mo10B1 | 3.00 | 1.80 | 20 | 0 | 0.1 | 0 |
| Ti37V5Cr48Mo8Nb2 | 3.10 | 2.00 | 20 | 0 | 0.1 | 30 |
| Ti37V5Cr50Mo6W2 | 3.10 | 2.00 | 20 | 0 | 0.1 | 0 |
| Ti36V10Cr47Mo7 | 3.30 | 2.43 | 20 | 0 | 0.1 | 45 |
| Ti36V10Cr47Mo5W2 | 3.20 | 2.00 | 20 | 0 | 0.1 | 0 |
| Ti36V10Cr47Mo5Nb2 | 3.35 | 2.30 | 20 | 0 | 0.1 | 30 |
| Ti36V10Cr46Mo8 | 3.42 | 2.10 | 20 | 0 | 0.1 | 0 |
| Ti36V8Cr46Mo8Nb2 | 3.33 | 2.00 | 20 | 0 | 0.1 | 0 |
| Ti36V12Cr42Mo10 | 3.27 | 2.10 | 20 | 0 | 0.1 | 45 |

Figure 4:
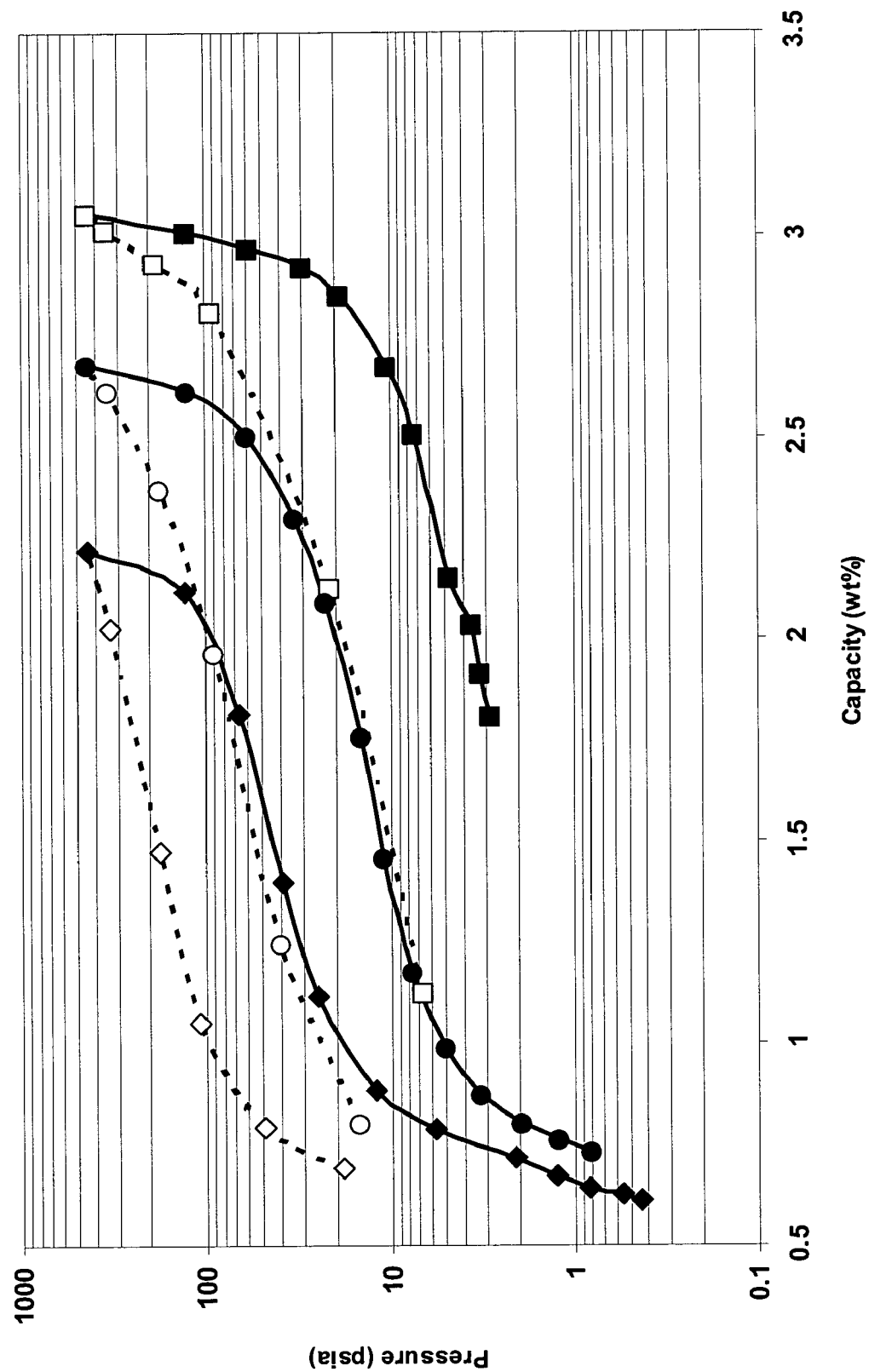
FIG. 4, is a PCT diagram showing the absorption and desorption of hydrogen at different temperatures for the OVB34 alloy in accordance with the present invention.

To improve performance of the hydrogen storage alloys in regard to impurity sensitivity, high absorption/desorption hysteresis, and slope of the PCT diagram, manganese may be included in the hydrogen storage alloy. Examples of these alloys are shown with respective absorption and desorption capacities below in Table 2. The alloys containing manganese, however, require a higher amount of vanadium to stabilize the body centered cubic structure. Shown in FIG. 4, is a PCT diagram demonstrating the absorption and desorption of hydrogen at 0° C. (■), 30° C. (●), and 60° C. (♦) for the $Ti_{34}V_{17}Cr_{33}Mn_{14}Mo_5$ alloy in accordance with the present invention.

Figure 6:
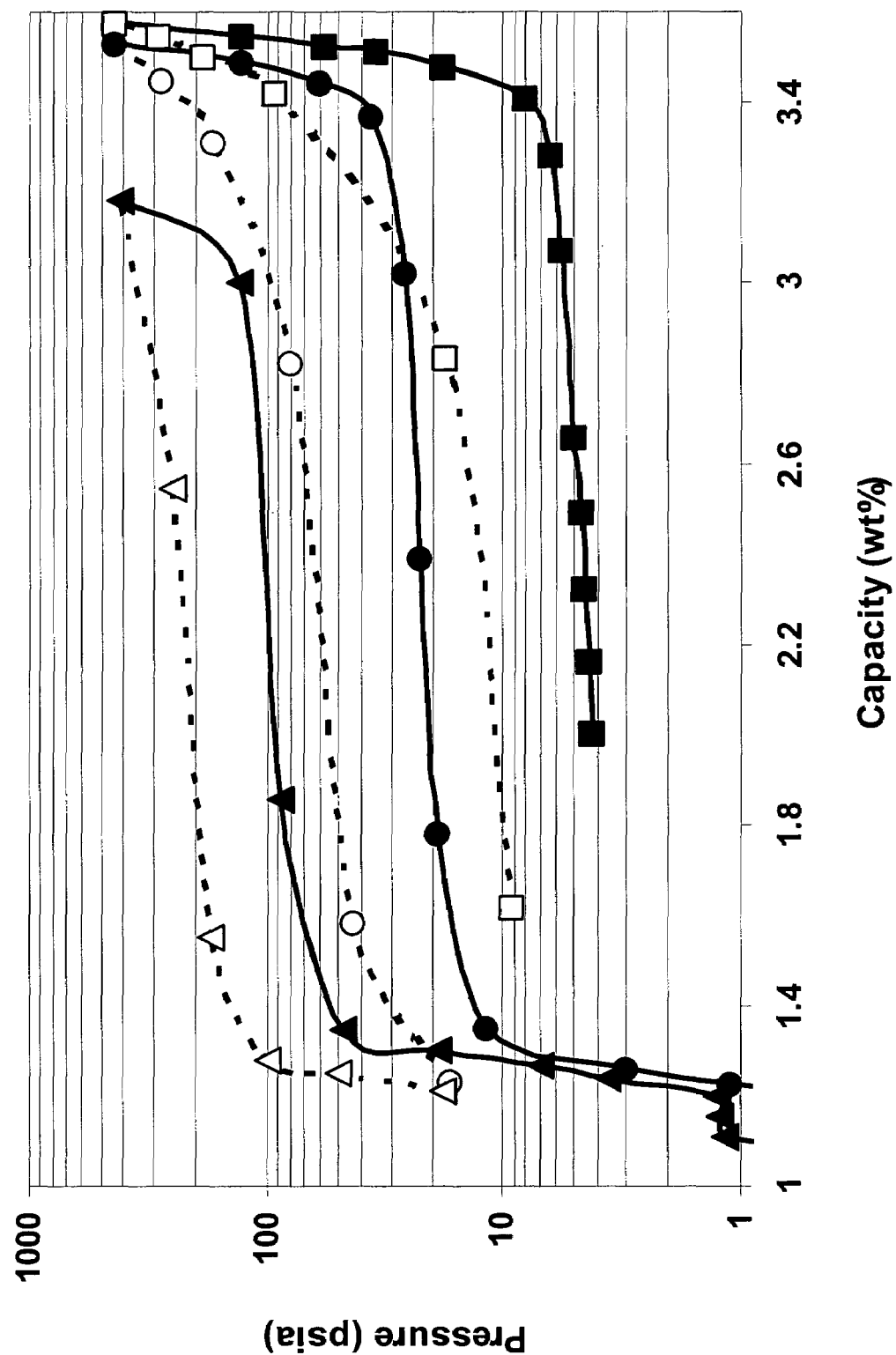
FIG. 6, is a PCT diagram showing the absorption and desorption of hydrogen at different temperatures for the OVB49 alloy in accordance with the present invention.

Trace amounts of iron or nickel may also be included in the hydrogen storage alloy. Inclusion of iron and/or nickel can improve the performance of the hydrogen storage alloy by increasing the reversible amount of hydrogen at a given temperature and pressure as shown by the flattening the plateau shown in the PCT diagram. Inclusion of trace amounts of palladium have also shown to dramatically improve the activation of the alloys. Shown in FIG. 6, is a PCT diagram demonstrating the absorption and desorption of hydrogen at 0° C. (■), 30° C. (●), and 60° C. (▲) for the $Ti_{10}V_{75}Cr_{12}Mn_{2.2}Fe_{0.8}$ alloy in accordance with another aspect of the present invention.

TABLE 2

| Composition | (H wt %)$_{max}$ | (H wt %)$_{rev}$ | P$_{abs}$ (psia) | T$_{abs}$ (° C.) | P$_{des}$ (psia) | T$_{des}$ (° C.) |
|---|---|---|---|---|---|---|
| Ti34V17Cr32Mn12Mo5 | 3.17 | 2.1 | 450 | 0 | 1 | 30 |
| Ti34V17Cr33Mn14Mo5 | 3.06 | 2.35 | 450 | 0 | 1 | 60 |
| Ti34V17Cr34Mn10Mo3Nb2 | 2.7 | 2.05 | 450 | 0 | 1 | 60 |
| Zr1Ti33V17Cr34Mn10Mo5 | 2.78 | 2.1 | 450 | 0 | 1 | 60 |
| Ti34V17Cr34Mn9Fe1Mo5 | 2.97 | 2.3 | 450 | 0 | 1 | 60 |
| Ti34V17Cr34Mn8Fe2Mo5 | 2.99 | 2.33 | 450 | 0 | 1 | 60 |
| Ti34V17Cr34Mn9Mo5Ni1 | 2.81 | 2.03 | 450 | 0 | 1 | 30 |
| Ti34V17Cr34Mn8Mo5Ni2 | 2.99 | 2.33 | 450 | 0 | 1 | 80 |

TABLE 3

| Composition | (H wt %)$_{max}$ | (H wt %)$_{rev}$ | P$_{abs}$ (psia) | T$_{abs}$ (° C.) | P$_{des}$ (psia) | T$_{des}$ (° C.) |
|---|---|---|---|---|---|---|
| Ti10V70Cr17Mn2.3Fe0.7 | 3.40 | 2.32 | 450 | 0 | 10 | 30 |
| Ti10V70Cr17Fe3 | 2.93 | 1.80 | 450 | 0 | 10 | 30 |
| Ti10V70Cr17Ni3 | 2.89 | 1.70 | 450 | 0 | 10 | 30 |
| Ti10V75Cr12Mn2.2Fe0.8 | 3.58 | 2.35 | 450 | 0 | 10 | 60 |
| Ti10V75Cr12Mn2.2Fe0.8 | 3.79 | 2.37 | 1000 | 20 | 1 | 20 |
| Ti10V75Cr12Fe3 | 3.09 | 1.85 | 450 | 0 | 1 | 30 |
| Ti20V50Cr25Mn5 | 3.41 | 2.30 | 450 | 0 | 1 | 30 |
| Ti20V50Cr20Mn10 | 2.41 | 1.30 | 450 | 0 | 1 | 30 |
| Ti12V64Cr20Mn1.7Fe0.6Ni1.3 | 3.47 | 2.10 | 450 | 0 | 10 | 30 |
| Ti14V60Cr23Mn2Ni1 | 3.39 | 2.15 | 450 | 0 | 10 | 30 |
| Ti16V55Cr26Mn2Ni1 | 3.53 | 2.23 | 450 | 0 | 10 | 30 |
| Ti17V50Cr30Mn2Ni1 | 3.28 | 2.10 | 450 | 0 | 1 | 0 |
| Ti19V50Cr28Mn2Ni1 | 3.49 | 2.30 | 450 | 0 | 1 | 30 |
| Ti20V50Cr27Mn2Ni1 | 3.47 | 2.20 | 450 | 0 | 1 | 30 |
| Ti19V45Cr33Mn2Ni1 | 3.33 | 2.10 | 450 | 0 | 1 | 30 |
| 8V76.4Cr12Mn2.2Fe0.75Ni0.6 | 3.56 | 2.25 | 1000 | 20 | 1 | 20 |
| Ti19V50Cr28Mn3 | 3.53 | 2.28 | 1000 | 20 | 1 | 20 |
| (Ti19V50Cr28Mn3)99Ni1 | 3.53 | 2.28 | 1000 | 20 | 1 | 20 |
| (Ti19V50Cr28Mn3)99Fe1 | 3.30 | 2.28 | 1000 | 20 | 1 | 20 |
| (Ti19V50Cr28Mn3)99Pd1 | 3.41 | 2.20 | 1000 | 20 | 1 | 20 |
| Ti10V75Cr12Mn2.5Ni0.5 | 3.75 | 2.31 | 1000 | 20 | 1 | 20 |
| Ti14V63.5Cr19.5Mn2Ni1 | 3.52 | 2.30 | 1000 | 20 | 2 | 20 |

Figure 7:
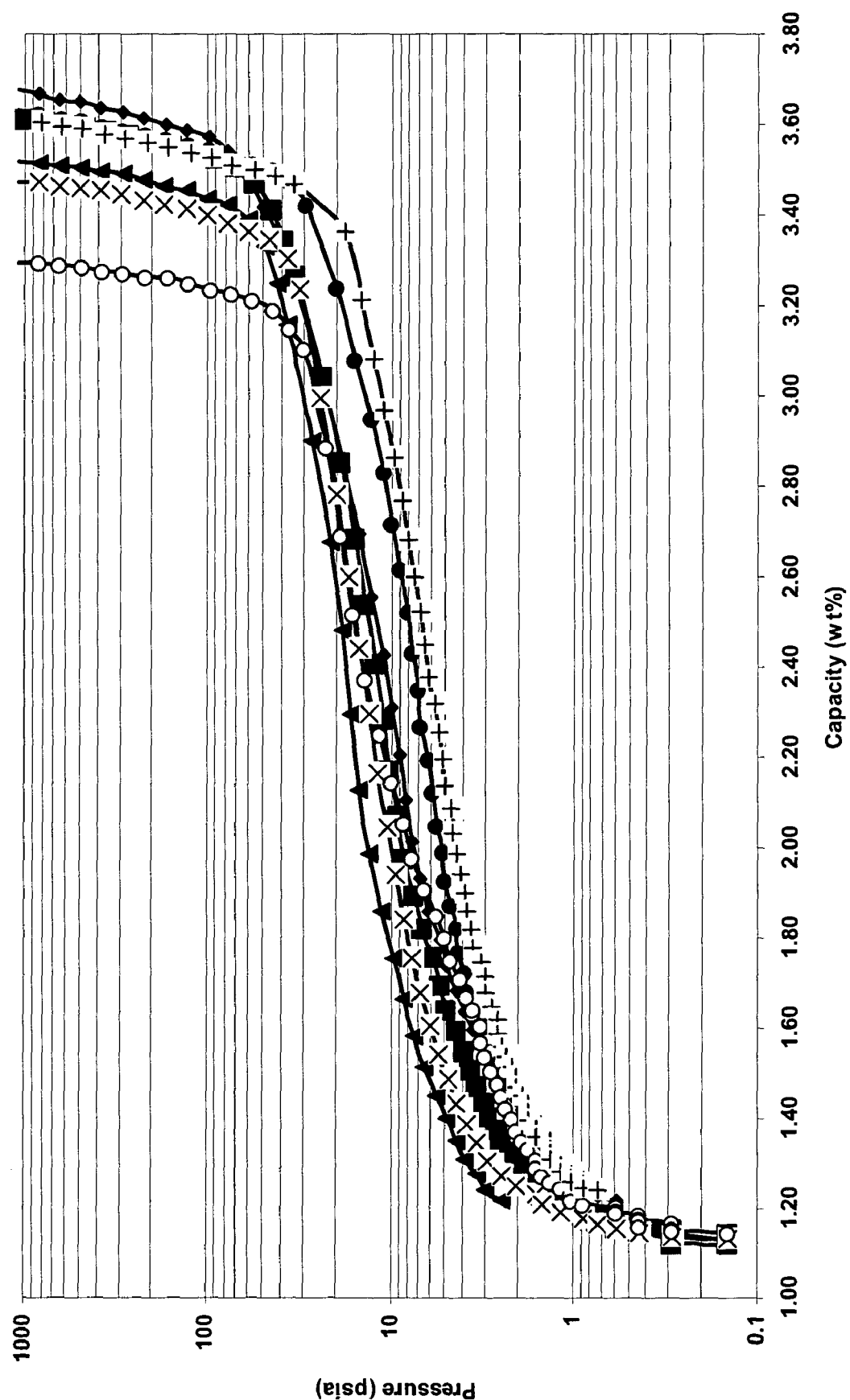
FIG. 7, is a PCT diagram showing the desorption of hydrogen at 20° C. for alloys OVB99, OBB112, OVB113, OVB114, OVB115, OVB117, and OVB119 in accordance with the present invention
Figure 8:
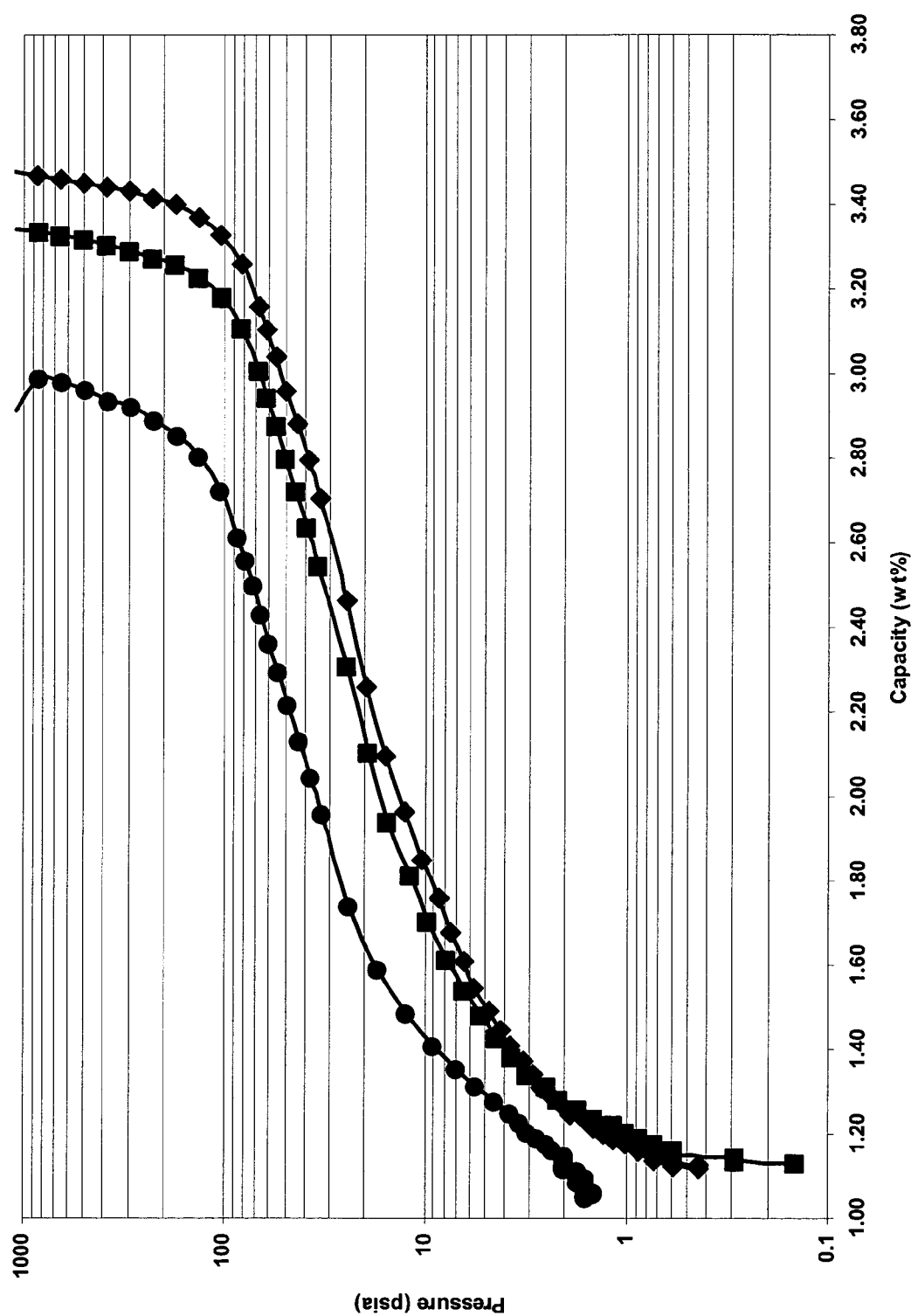
FIG. 8, is PCT diagram demonstrating the effect of iron on hydrogen desorption at 20° C. for alloys in accordance with the present invention.

Another type of hydrogen storage alloys in accordance with the present invention are medium vanadium content body centered cubic hydrogen storage alloys. The crystal structures of the medium vanadium content body centered cubic phase alloys are more flexible, with respect to the high vanadium content alloys, but more stable, with respect to the low vanadium content alloys. Such alloys are shown with respective absorption and desorption capacities in Table 4. Shown in FIG. 7, is a PCT diagram demonstrating the desorption of hydrogen at 20° C. for alloys $Ti_{29}V_{29}Cr_{37}Mn_3Fe_2$ (♦), $Ti_{29}V_{29}Cr_{35}Mn_5Fe_2$ (■), $Ti_{28}V_{30}Cr_{35}Mn_5Fe_2$ (▲), $Ti_{29}V_{29}Cr_{33}Mn_7Fe_2$ (X), $Ti_{30}V_{29}Cr_{32}Mn_7Fe_2$ (○), $T_{29}V_{29}Cr_{34}Mn_5Fe_2$ ( ), and $Ti_{29}V_{29}Cr_{30}Mn_9Fe_2$ (+) in accordance with the present invention. Body centered cubic phase alloys exhibit a number of hydride phases. The hydrides forming at low pressures are a serial of lattice expanded or slightly distorted solid solution body centered cubic phases. High vanadium content solid solution body centered cubic hydrides are relatively stable. The thermal stability of the alloys may be reduced by replacement of vanadium with transition metals such as titanium, chromium, cobalt, iron, nickel, copper, ruthenium, rhenium, rhodium, copper, palladium, osmium, molybdenum, niobium, tungsten, platinum, iridium, silver, or other transition metals. By replacing some of the vanadium with these transition metal elements, the resulting structure exhibits greater flexibility resulting in a reduction in hydrogen trapping which provides for enhanced reversible hydrogen storage capacity. Shown in FIG. 8, is PCT diagram demonstrating the effect of iron on hydrogen desorption at 20° C. for alloys in accordance with the present invention. Specifically shown is the $Ti_{30}V_{23}Cr_{42}Mn_3Fe_2$ alloy (♦), the $Ti_{31}V_{22}Cr_{41}Mn_3Fe_3$ alloy (■), and the $Ti_{33}V_{21}Cr_{37}Mn_3Fe_6$ alloy ( ).

TABLE 4

| Composition | (H wt %)$_{max}$ | (H wt %)$_{rev}$ | P$_{abs}$ (psia) | T$_{abs}$ (° C.) | P$_{des}$ (psia) | T$_{des}$ (° C.) |
|---|---|---|---|---|---|---|
| Ti27V30.8Cr37Mn3Fe2Zr.2 | 3.18 | 2.01 | 1000 | 20 | 3 | 20 |
| Ti28V30Cr37Mn3Fe2 | 3.58 | 2.39 | 1000 | 20 | 1 | 20 |
| Ti29V29Cr37Mn3Fe2 | 3.68 | 2.49 | 1000 | 20 | 0.6 | 20 |
| Ti30V23Cr42Mn3Fe2 | 3.48 | 2.36 | 1000 | 20 | 0.6 | 20 |
| Ti31V22Cr41Mn3Fe3 | 3.34 | 2.19 | 1000 | 20 | 0.6 | 20 |
| Ti31.7V21.7Cr39.6Mn3Fe4 | 3.34 | 2.19 | 1000 | 20 | 0.6 | 20 |
| Ti33V21Cr37Mn3Fe6 | 3.00 | 1.95 | 1000 | 20 | 1.5 | 20 |
| Ti33V22Cr36Mn3Fe6 | 3.24 | 2.18 | 1000 | 20 | 1.5 | 20 |
| Ti29V29Cr35Mn5Fe2 | 3.60 | 2.44 | 1000 | 20 | 1 | 20 |
| Ti28V30Cr35Mn5Fe2 | 3.52 | 2.32 | 1000 | 20 | 3 | 20 |
| Ti29V29Cr33Mn7Fe2 | 3.47 | 2.32 | 1000 | 20 | 0.6 | 20 |
| Ti30V29Cr32Mn7Fe2 | 3.63 | 2.42 | 1000 | 20 | 1 | 20 |
| Ti29V29Cr34Mn5Fe2 | 3.30 | 1.80 | 1000 | 20 | 2.5 | 20 |
| Ti30V29Cr30Mn9Fe2 | 3.59 | 2.20 | 1000 | 20 | 2 | 20 |
| Ti29V31Cr29Mn9Fe2 | 3.08 | 2.00 | 1000 | 20 | 1 | 20 |
| Ti29V29Cr37Mn3Ru2 | 3.52 | 2.45 | 1000 | 20 | 3 | 20 |
| Ti29V29Cr37Mn3Co2 | 3.63 | 2.52 | 1000 | 20 | 2 | 20 |
| Ti29V29Cr36Mn3Fe1Co2 | 2.45 | 2.21 | 1000 | 20 | 3 | 20 |
| Ti29V29Cr36Mn3Co3 | 2.48 | 2.36 | 1000 | 20 | 1 | 20 |
| Ti29V29Cr35Mn5Co2 | 3.61 | 2.48 | 1000 | 20 | 1 | 20 |
| Ti29V29Cr35Mn7Co2 | 3.52 | 2.39 | 1000 | 20 | 1 | 20 |
| Ti30V29Cr34Mn5Co2 | 3.63 | 2.47 | 1000 | 20 | 1 | 20 |
| Ti31V29Cr33Mn5Co2 | 3.64 | 2.35 | 1000 | 20 | 1 | 20 |
| Ti32V29Cr32Mn5Co2 | 3.6 | 2.44 | 1000 | 20 | 1 | 20 |

TABLE 4-continued

| Composition | (H wt %)$_{max}$ | (H wt %)$_{rev}$ | P$_{abs}$ (psia) | T$_{abs}$ (° C.) | P$_{des}$ (psia) | T$_{des}$ (° C.) |
|---|---|---|---|---|---|---|
| Ti33V23Cr35Mn7Co2 | 3.52 | 2.32 | 1000 | 20 | 1 | 20 |
| Ti29V29Cr37Mn3Ni2 | 3.61 | 2.43 | 1000 | 20 | 1 | 20 |
| Ti20V50Cr24Mn5Co1 | 3.53 | 2.33 | 1000 | 20 | 1 | 20 |
| Ti20V50Cr24Mn5Fe1 | 3.43 | 2.25 | 1000 | 20 | 1 | 20 |
| Ti19V49Cr28Mn3Co1 | 3.49 | 2.36 | 1000 | 20 | 1 | 20 |
| Ti21V48Cr25Mn5.5Fe.5 | 3.62 | 2.47 | 1000 | 20 | 1 | 20 |
| Ti22V46Cr25Mn6.5Fe.5 | 3.65 | 2.48 | 1000 | 20 | 1 | 20 |
| Ti20V47Cr29Mn3Co1 | 3.45 | 2.39 | 1000 | 20 | 1 | 20 |
| Ti20V46Cr30Mn3Co1 | 3.42 | 2.35 | 1000 | 20 | 1 | 20 |
| Ti21V44Cr31Mn3Co1 | 3.36 | 2.31 | 1000 | 20 | 1 | 20 |
| Ti22V42Cr32Mn3Co1 | 3.34 | 2.29 | 1000 | 20 | 1 | 20 |
| Ti23V40Cr33Mn3Co1 | 2.35 | 2.25 | 1000 | 20 | 1 | 20 |

Figure 9:
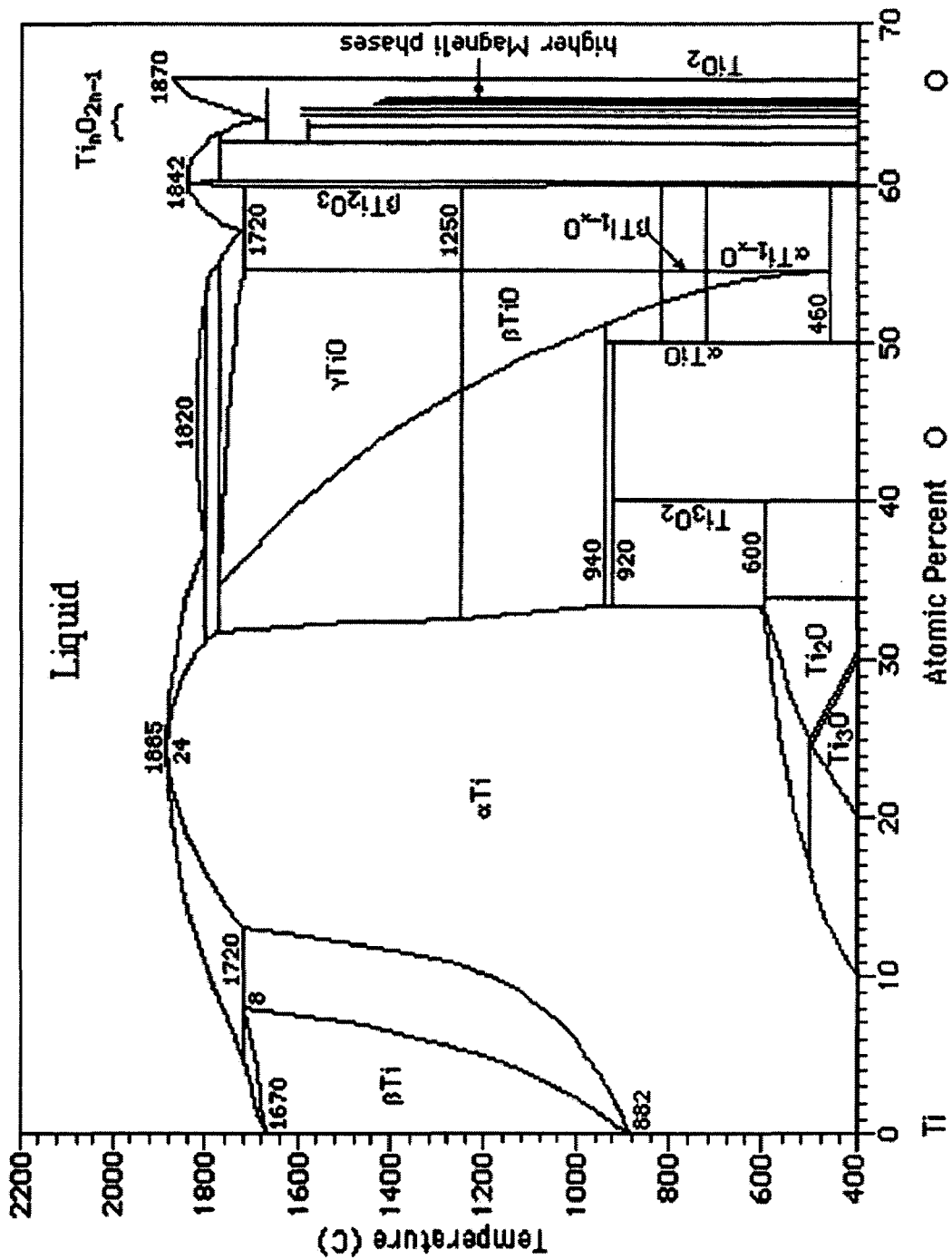
FIG. 9, is a phase diagram for titanium showing concentrations of oxygen.
Figure 10:
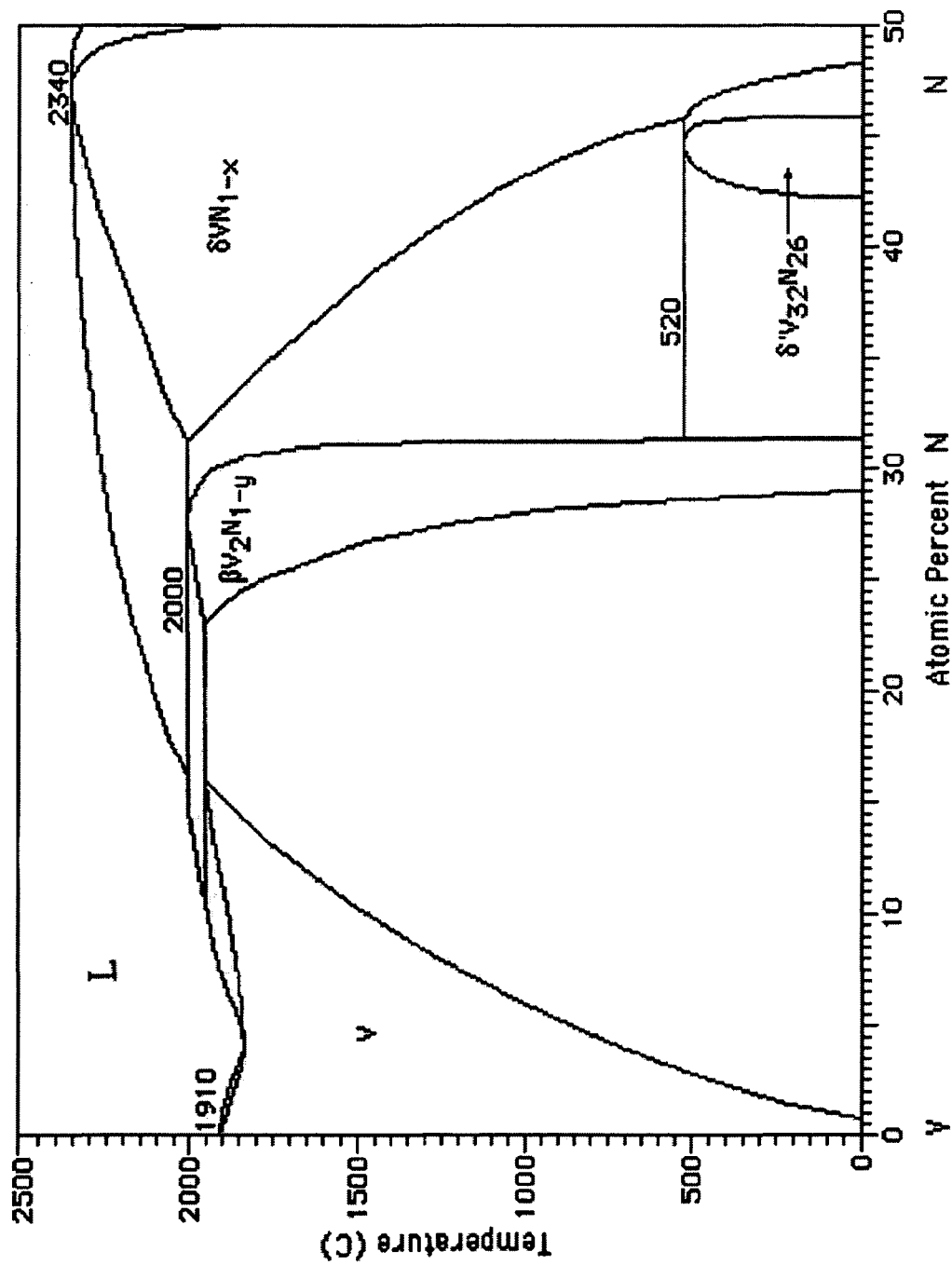
FIG. 10, is a phase diagram for vanadium showing the concentrations of nitrogen.

Upon production of the alloys in accordance with the present invention, contaminants such as oxygen, nitrogen, and carbon may be present within the alloy. Such contaminants may be dissolved in the molten alloy. FIG. 9 is a phase diagram for titanium specifically showing the amount of oxygen dissolved in molten titanium. FIG. 10 is a phase diagram for vanadium specifically showing the amount of nitrogen dissolved in molten vanadium. The presence of such elements may decrease the ductility of the alloy causing reduction in the hydrogen storage capacity of the alloy upon cycling. To improve performance of the alloys, up to 1.0 weight percent of an oxygen/nitrogen/carbon scavenger material may be added to the molten alloy during production of the alloy. The scavenger material may react with any oxygen, carbon, and/or nitrogen contained in the molten alloy to form oxides, nitrides, carbides, oxycarbides, oxynitrides, carbonitrides, and/or oxycarbonitrides which separate out of the molten alloy forming a secondary phase dispersed throughout the cooled alloy. The scavenger material may include one or more elements selected from misch metals, magnesium, calcium (misch metal being a rare earth metal or combination/alloy of one or more of the rare earth elements). By removing elements such as oxygen, nitrogen, and carbon from the molten alloy, the inventors believe that the hydrogen storage alloy exhibits increased ductility thereby eliminating reduction in hydrogen storage capacity resulting from breaking of the body centered cubic crystal structure through multiple cycling.

The alloys of the present invention may be produced by arc melting in an argon atmosphere. Once melted, the melted alloy is cooled into alloy ingots. To ensure homogeneity of the alloy, the alloy ingots may be remelted as needed. The alloy ingots are then crushed and activated by heating under vacuum at temperatures ranging from 80° C. to 400° C.

EXAMPLE

Figure 11:
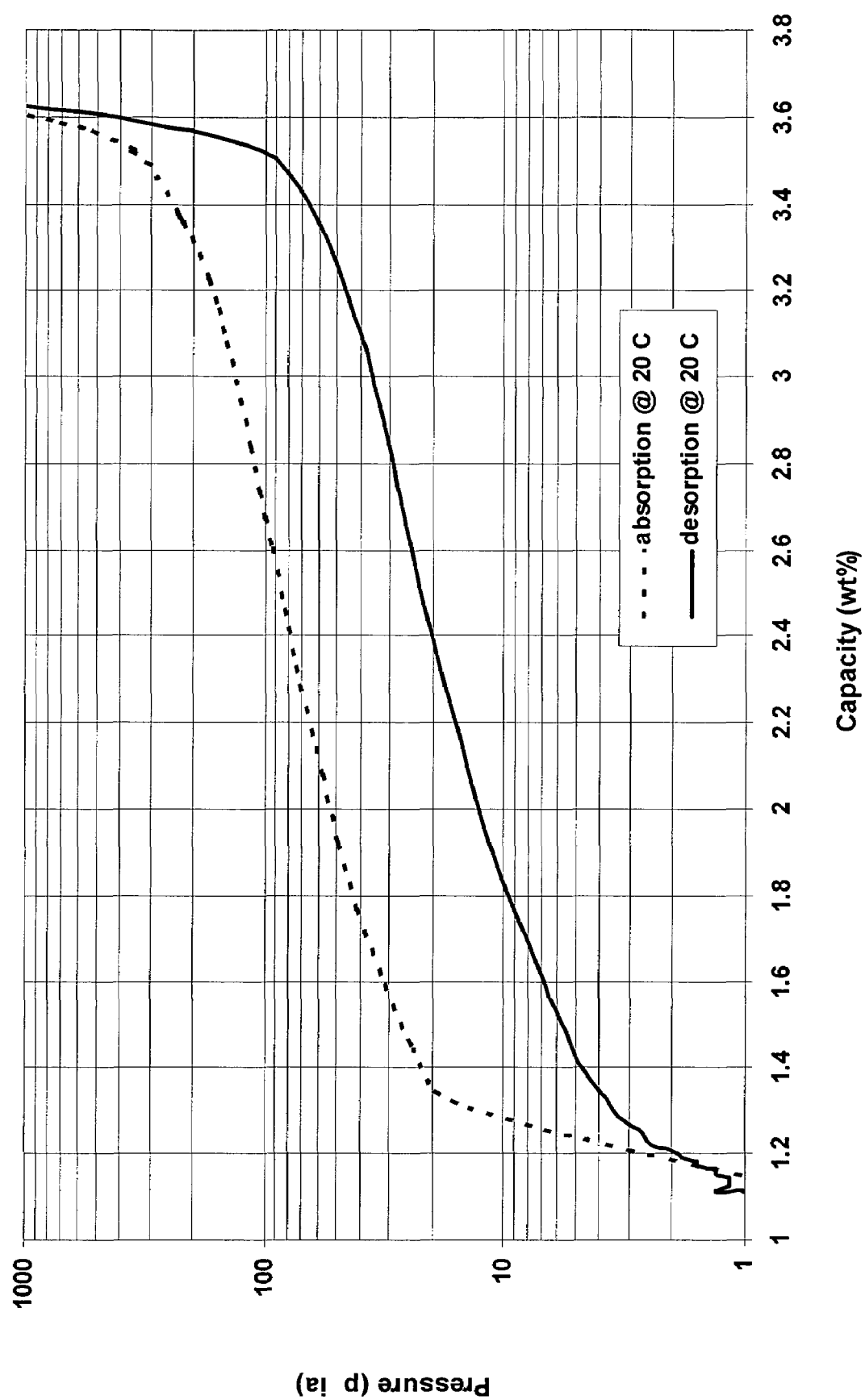

A hydrogen storage alloy in accordance with the present invention was prepared and tested to determine its hydrogen absorption properties. The alloy was prepared by arc melting of the industrial grade elements (Ti: 27.37 gram; V: 29.13 gram; Cr: 37.93 gram; Mn: 3.25 gram; Co: 2.32 gram) in a water-cooled copper hearth in an argon atmosphere. The ingot was turned over and re-melted four times to ensure the compositional homogeneity. A 5.0 gram sample of the alloy was put into the sample chamber of a Pressure-Composition-Temperature (PCT) unit. The sample was heated to 350° C. under vacuum for 1 hour. Subsequently, hydrogen was introduced to 500 psi and it was cooled down to room temperature for activation. To obtain the hydrogen capacity zero point, the sample chamber was evacuated at 350° C. for 3 hours. A PCT cure for the alloy is shown in FIG. 11.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

The invention claimed is:

1. A hydrogen storage alloy comprising;
   a first phase and a secondary phase dispersed throughout said first phase;
   said first phase comprising 10 to 40 atomic percent titanium, 0.5 to 80 atomic percent vanadium, 10 to 60 atomic percent chromium and greater than 0 to 15 atomic percent manganese;
   said secondary phase comprising one or more oxides, nitrides, carbides, oxycarbides, oxynitrides, carbonitrides, or oxycarbonitrides, wherein said one or more oxides, nitrides, carbides, oxycarbides, oxynitrides, carbonitrides, or oxycarbonitrides each include at least one metal selected from magnesium or calcium;
   said hydrogen storage alloy, at temperatures of 40° C. or less, reversibly storing at least 1.75 weight percent hydrogen and desorbing at least 60% of the maximum hydrogen storage capacity.

2. The hydrogen storage alloy according to claim 1, wherein said first phase further comprises one or more modifier elements selected from cobalt, iron, nickel, copper, ruthenium, rhenium, rhodium, copper, palladium, osmium, molybdenum, niobium, tungsten, platinum, iridium, and silver.

3. The hydrogen storage alloy according to claim 1, wherein said first phase comprises 0.5 to 4.5 atomic percent vanadium.

4. The hydrogen storage alloy according to claim 3, wherein said first phase further comprises molybdenum.

5. The hydrogen storage alloy according to claim 1, wherein said first phase comprises 61 to 80 atomic percent vanadium.

6. The hydrogen storage alloy according to claim 5, wherein said first phase further comprises iron.

7. The hydrogen storage alloy according to claim 5, wherein said first phase further comprises palladium.

8. The hydrogen storage alloy according to claim 1, wherein said first phase comprises 3.0 to 9.0 atomic percent manganese.

9. The hydrogen storage alloy according to claim 1, wherein said first phase further comprises iron.

10. The hydrogen storage alloy according to claim 9, wherein said first phase further comprises cobalt.

11. The hydrogen storage alloy according to claim 1, wherein said first phase further comprises ruthenium.

12. The hydrogen storage alloy according to claim 1, wherein said first phase further comprises cobalt.

13. The hydrogen storage alloy according to claim 1, wherein said hydrogen storage alloy reversibly stores at least 2.0 weight percent hydrogen at temperatures of 40° C. or less.

14. The hydrogen storage alloy according to claim 1, wherein, said hydrogen storage alloy reversibly stores at least 2.3 weight percent hydrogen at temperatures of 40° C. or less.

15. The hydrogen storage alloy according to claim 1, wherein said hydrogen storage alloy desorbs at least 65% of the hydrogen stored at the maximum hydrogen storage capacity at temperatures of 40° C. or less.

16. The hydrogen storage alloy according to claim 1, wherein said hydrogen storage alloy is desorbs at least 70% of the hydrogen stored at the maximum hydrogen storage capacity at temperatures of 40° C. or less.

* * * * *